Dec. 13, 1927.

W. SCHWEYDAR 1,652,255

GRAVITATION METER FOR MEASURING THE VERTICAL
GRADIENT OF THE GRAVITY OF THE EARTH

Filed April 9, 1927

Inventor:
Wilhelm Schweydar
by
Attorney

Patented Dec. 13, 1927.

1,652,255

UNITED STATES PATENT OFFICE.

WILHELM SCHWEYDAR, OF POTSDAM, GERMANY.

GRAVITATION METER FOR MEASURING THE VERTICAL GRADIENT OF THE GRAVITY OF THE EARTH.

Application filed April 9, 1927, Serial No. 182,442, and in Germany March 11, 1926.

This invention relates to a gravitation meter, that is to say, to an apparatus for measuring the vertical gradient of the gravity of the earth by comparing the bifilar turning moment due to gravity with the torsional moment of a helical spring.

With all known apparatus of this kind the length of the helical spring is strongly influenced by changes of temperature so that the employment of such a spring is possible only in rooms that are particularly protected as regards temperature. The invention obviates this drawback by substituting for the spring a wire, the upper end of which is carried by a scale-beam balance, for instance, by a counter-poise. The influence of the temperature is now much smaller. The measurement is effected by suspending the counter-poise first directly from the scale-beam and then indirectly, viz. by the interposition of a comparatively long thread. The effect of the counter-poise is different in the two cases because the gravity acts in both cases by different strengths owing to the distances of the counter-poise from the earth's centre being different in the two cases, and the quantity to be measured can be ascertained by that difference.

The observation of the turning of the apparatus can be effected by the reading of a mirror.

Figure 1:
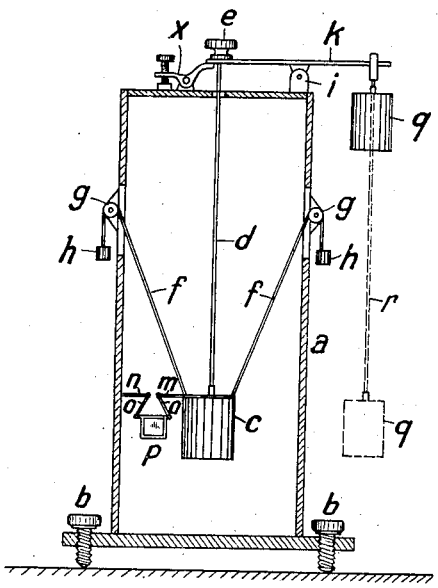
Figure 2:
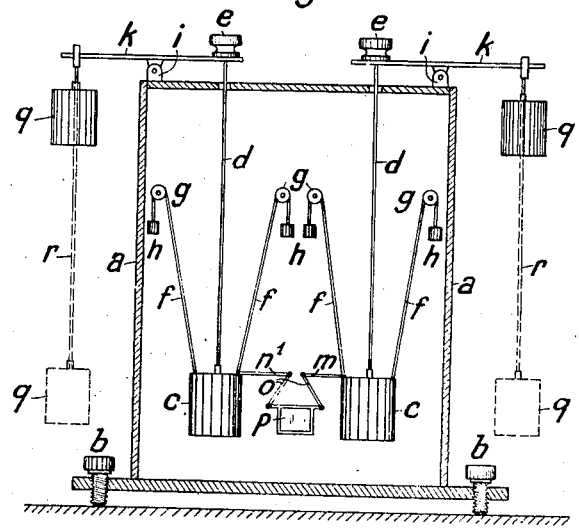

The invention is illustrated diagrammatically and by way of example on the accompanying drawing, on which Figure 1 shows an apparatus provided with one main poise and one counter-poise, and Figure 2 shows a modification in which two main poises and two counter-poises are used.

On the drawing, $a$, Fig. 1, denotes a casing which can be adjusted accurately vertically by adjusting screws $b$. The main poise $c$ is carried chiefly by the wire $d$ and partly, i. e. for a very small part, by threads $f, f$ guided over rolls $g$ and kept under a certain tension by small poises $h$. When these threads are under the pull of the poises $h$, they are clamped fast in the respective position by means of suitable clamping devices (not shown) provided near the rolls $g$.

The wire $d$ is attached to one end of the scale-beam $k$ that oscillates on a horizontal axle $i$; the wire $d$ can be distorted by a knob $e$. The other end of the scale-beam carries the counter-poise $q$ that can be suspended from the scale-beam either directly, or indirectly by the intermediary of a comparatively long thread $r$, as indicated in dotted lines. In order to prevent the scale-beam from being turned when the knob is turned, a checking device $x$ is provided by means of which the beam can be held fast in any desired position.

The poise $c$ is provided with a pointer $m$ and the casing $a$ with a pointer $n$ and the arrangement is such that the opposite ends of the two pointers lie in close proximity to one another; a mirror $p$ is suspended from the pointer ends by means of two threads $o$.

The manner of operation of the device is as follows:

After the instrument has been set up and adjusted to accurately vertical position, the knob $e$ is turned so as to distort the wire $d$, the axial turning of the wire being transmitted to the poise $c$ and the wires $f$ being crossed correspondingly until they have arrived at the place of unbalance, in the proximity of which a measurable turning of the pointer $m$ about the distorted thread $d$ is effected by a slight alteration of the pull of the poise $c$. The lifting or sinking of the poise $q$ and of the thread $d$, that is to say, the longitudinal shifting of these members, arising by said turning of the knob $e$, is compensated by a corresponding inclination of the scale-beam $k$, the latter being free of the checking device $x$. When measuring the vertical gradient of the gravity the counter-poise $q$ is suspended first directly from the beam, as shown in full lines, and then indirectly by the intermediary of the thread $r$, as shown in dotted lines, and finally the difference of the deflection of the pointer $m$ is ascertained, or measured respectively, in a known manner preferably by means of the mirror $p$.

In the modification, Fig. 2, two instruments of the constructural form shown in Fig. 1 are combined with each other. The characteristic difference being that the lefthand pointer $n^1$ is attached not to the casing, but to the lefthand counter-poise $c$ whereby a twice as large deflection of the mirror $p$ is obtained and the accuracy of the reading is, therefore, doubled.

I claim:

1. A gravitation meter for measuring the vertical radient of the gravity of the earth, comprising, in combination, a scale-beam, a thread suspended from one arm of said beam, a poise suspended from said thread, means for distorting the thread, two further threads connected with said poise and being so weighted as to partly balance the weight of said poise, and a counterpoise suspended from the other arm of the said scale-beam and being adapted to be suspended from the same in different heights.

2. A gravitation meter for measuring the vertical gradient of the gravity of the earth, comprising, in combination, a scale-beam, a thread suspended from one arm of said beam, a poise suspended from said thread, means for distorting the thread, two further threads connected with said poise and being so weighted as to partly balance the weight of said poise, a counter-poise suspended from the other arm of the said scale-beam and being adapted to be suspended from the same in different heights, and a reading-mirror suspended in bifilar manner, one of the appertaining suspension threads extending from the said poise the other from a counter-point.

3. A gravitation meter for measuring the vertical gradient of the gravity of the earth, comprising, in combination, a scale-beam, a thread suspended from one arm of said beam, a poise suspended from said thread, means for distorting the thread, two further threads connected with said poise and being so weighted as to partly balance the weight of said poise, a counter-poise suspended from the other arm of the said scale-beam and being adapted to be suspended from the same in different heights and a checking device adapted to check the said beam in any desired position.

In testimony whereof I have affixed my signature.

WILHELM SCHWEYDAR.